United States Patent [19]

Nelson et al.

[11] 4,412,263
[45] Oct. 25, 1983

[54] RECORDING HEAD PROTECTIVE OVERLAY AND CLEANING ARRANGEMENT

[75] Inventors: Alfred M. Nelson, Redondo Beach, Calif.; Houshang Rasekhi, Convent Station; Ronald J. Cieplik, Mountain Lakes, both of N.J.

[73] Assignee: Wang Laboratories, Inc., Lowell, Mass.

[21] Appl. No.: 290,272

[22] Filed: Aug. 5, 1981

[51] Int. Cl.³ .......................... G11B 5/41; G11B 23/50
[52] U.S. Cl. ..................................... 360/128; 360/137; 360/93
[58] Field of Search ......................... 360/128, 137, 93; 346/74.5; 15/256.5, 97 R, 110 R

[56] References Cited

U.S. PATENT DOCUMENTS

| 2,905,767 | 9/1959 | Eckert, Jr. et al. | 360/128 |
| 3,731,289 | 5/1973 | Bajgert et al. | 360/128 |
| 4,004,314 | 1/1977 | Post et al. | 360/128 |
| 4,178,405 | 12/1979 | Berkowitz | 360/134 |
| 4,257,079 | 3/1981 | Yoshizawa | 360/128 |
| 4,266,256 | 5/1981 | Kato et al. | 360/128 |

OTHER PUBLICATIONS

IBM Tech. Discl. Bull., G. F. Pennell et al., Magnetic Read Head Protector, vol. 21, No. 3, Aug. 1978, pp. 978-979.

*Primary Examiner*—Alfred H. Eddleman
*Attorney, Agent, or Firm*—Michael H. Shanahan; Joseph E. Funk

[57] ABSTRACT

A recording head protective overlay arrangement with an alarm capability is provided. The protective overlay is continuously replenishable between the recording surface of the recording head and the recording medium and is movable in a direction opposite to that of the recording medium so as to provide a cleaning function as well as a wear-preventive function. A dispenser cartridge housing the protective overlay is provided which is specially designed to closely conform to the recording head. A pivotable cartridge holder is included for enabling the cartridge to be inserted in a position remote from the recording head and pivotable into an operative position with the recording head. The tape medium itself and various components operatively associated therewith are pivotably mounted, to provide movement of the medium into intimate operative contact with the overlay and the recording head.

15 Claims, 5 Drawing Figures

RECORDING HEAD PROTECTIVE OVERLAY AND CLEANING ARRANGEMENT

BACKGROUND OF THE INVENTION

This invention relates to an arrangement for providing wear, damage and soiling protection of the portion of a recording head which is in intimate operative contact and experiences substantially continuous relative movement with a recording medium. More particularly, the present invention relates to such a protective arrangement in recording systems in which the magnetic latent image created on the recording medium by the recording head is developed with dry magnetic toner. The invention has particular application to magnetographic printing systems.

Recent trends in systems employing a magnetic recording medium, such as a tape, in intimate operative contact with and being imaged by a magnetic recording head, have inter alia called for substantially higher speeds of operation. This in turn has led to increased relative contacting movement between the medium and the recording head. As a result, the incidence of wear has become a point of considerably greater concern in such systems.

This concern potentially is compounded severly in those applications in which the magnetic latent image recording on say the tape medium is developed with dry magnetic toner particles, for subsequent transfer to e.g. paper. Such particles are known to accumulate at the recording zone and thus interfere with the recording process. Moreover the toner particles have a grating effect on the recording head if allowed to come into moving contact therewith, such as would be the case for instance if the steps taken in the recording system for cleaning the residual (post-transfer) toner particles from the tape are not completely successful or fail for whatever reason. Experimentally it has been determined that for the speeds now contemplated for movement of the tape medium passed the recording head, i.e., 35 to 55 inches per second, scoring of the recording head begins in as little time as several seconds and usually within a minute or two. For recording head designs in which the recording zone area of the recording elements is especially delicate (e.g. the thickness of the operative portion of the recording elements at the recording zone being on the order of ¼ mil thick), such as is the case for example with the recording head design found in U.S. Pat. No. 4,025,927 to Nelson, permanent damage to the recording head is experienced in a few minutes without suitable protection.

Solutions have already been proposed to protect the recording head face with an overlay material. See for example U.S. Pat. No. 3,521,295, Column 3, lines 29 through 33. Generally speaking, these solutions involve permanent or semi-permanent attachments to the recording head face and/or are only replaceable by hand. Permanent attachment of the overlay protector material to the recording head leads to a series of undesirable aspects. First of all, and most importantly, the thicker the overlay material, for purposes of providing its own longevity, the farther away the recording medium must be from the actual recording zones of the recording head. This leads to the necessity of higher recording currents for generating sufficient magnetic field strength to adequately influence the magnetic recording medium across this greater distance. Also, lower magnetic gradients result, with corresponding poorer edge definition with regard to the generated character images. This is especially problematical in those cases where high coercivity magnetic materials are employed. It is to be noted that the use of such magnetic materials is especially preferred in recent developments in magnetography. For higher articulate recording head designs, such as the aforementioned patented Nelson head, which are required for example, in high-quality printing applications, the requirement for substantially increased recording currents necessitated by the use of the permanent overlay material leads to excessive heat generation in a very delicate structure, with the predictable result of substantially reduced lifetime of the recording head structure and non-uniform recording of magnetic dots or pixels (both as to size and magnetic strength).

It will be appreciated, too, that the permanently or semi-permanently attached overlay protective arrangements also succomb to wear. As a result the relatively expensive recording head has to be replaced or at the least the overlay has to be removed and replaced. Either way one is faced with a commercially unattractive and expensive alternative.

With regard to the overlay protective arrangements which require replacement or advancement of the protective material by hand, such approaches require diligent monitoring of the total time of operation of the recording system by the consumer/end user as well as require of the end user an inordinate amount of technical knowledge of the recording system in order to perform such a task. The apparent alternative would be to have such tasks performed during servicing of the apparatus, but this too leads to a commercially unattractive solution.

In Electron Design, May 24, 1980, pages 31 and 32, an arrangement is known where the recording head is placed in operative contact with the back (non-operating) side of a mylar-based recording medium and recording is effected by generating magnetic fields through the Mylar to the magnetizable layer on the opposite side of the recording medium, there to be toned by dry toner on said opposite surface. However, it has been learned that such an arrangement, because of the relatively massive thickness of the recording medium, requires a relatively very expensive and rugged recording head to handle the relatively great recording currents needed to compensate for the separation between the recording elements and the magnetizable layer. Such an arrangement has failed to achieve sharp, articulate imaging and lacks good contrast between imaged and unimaged areas on the recording medium, as well as suffers from weak images that directly translate into relatively poor optical density. Additionally the recording medium will soon enough accumulate dust and toner particles on the back side since it isn't a continuously replenished clean surface that is being provided, but rather is the same surface being provided time and time again. As a result, the problem of soiling the recording head and accumulating damaging and undesirable dust and toner particles at the recording zone area cannot practically be avoided.

What is needed and would be highly useful, therefore, is to provide an arrangement which not only is able to protect the recording head from wear and damage, but is readily and automatically replenishable, is simplictically replaceable apart from the recording head and yet is readily engagable in intimate contact with the recording head, is thin enough so as not to adversely affect the recording current requirements (it is well known, for example, that an overlay material even as thin as ½ mil will be more than thick enough to severly disrupt the recording function), and which is automatically and readily moveable relative to the recording head and in intimate contact with the recording zone, and which continuously cleans the recording medium as it approaches the recording head and as such protects the head from soiling effects, and such is the principal object of this invention.

SUMMARY OF THE INVENTION

In accordance with the invention such a solution is provided by the combination of a feed reel of say ¼ mil thick clean plastic (e.g., Mylar) film which is slowly passed by and in intimate contact with the recording zone of the recording head and onto a take-up reel. The take-up reel is driven at a constant RPM during operation to provide a continuously renewed surface between the recording head and the recording surface. The speed of replenishment of the overlay protective film is not particularly critical and is typically five to fifteen inches per hour. The feed and take-up reels are provided in a plastic housing to protect the overlay film from contamination (e.g., of toner and/or atmospheric dust) and to provide a convenient cartridge arrangement for loading and unloading purposes. Protection from the dust is especially important since dust would otherwise collect on the (e.g., top surface of) Mylar film and deposit ultimately on the recording head causing, for example, undesirable nonuniform spacing increase between the recording head and the recording surface of the recording medium.

The invention provides for the ¼ mil thick Mylar film having a width sufficient to fully protect the entire array of recording elements of the recording head. The film is housed in the plastic cartridge suitably designed to expose only a small length of the Mylar film to the recording head at any one time. The cartridge is designed to accept suitable external drive for the feed and/or take-up spools in a very condensed structure that closely fits about the recording head face. The Mylar film is thus automatically metered (continuously replenished) past the array of recording elements of the head, throughout an operating condition which more or less continuously requires the recording medium to be in intimate proximity with yet be in relative movement past the recording element array, in distinct contrast to the prior art protective coatings which are permanently or semi-permanently and non-movably associated to the protected structure.

Among the very important advantages and features of an arrangement according to this invention, there is provided an automatic alarm in the event that the overlay cartridge has "run-out" of Mylar film or has for whatever reason ceased to replenish itself at and in the vicinity of the area of intimate operative contact between the recording head and the magnetic medium. In accordance with this invention the alarm arrangement makes use of the electricl conductivity of the recording head structure in the recording zone area, as well as the relative electrical conductivity of the magnetizable layer of the magnetic medium. In such arrangement, a condition of electrical contact between the magnetic tape and the recording head is instantly detectable and the appropriate machine drive mechanisms can be halted pursuant thereto. The condition of such an electrical contact can result, for example, from either the Mylar film running-out or it being worn-through due to a faulty feed of the Mylar film coupled with constant wear of the film by the moving recording medium.

Another very important feature of an arrangement constructed in accordance with the invention is the ability to be readily accessible and replaceable by the operator (end user) without any tools or special knowledge, and without disturbing or replacing either the magnetic tape or the recording head. In accordance with the invention this is accomplished via a pivotable loader arrangement designed to accept the overlay cartridge in a withdrawn first position, which loader is then readily pivotable to an operative second position which places the Mylar film snuggly in contact with the recording head between the latter and the recording medium. Additionally, in accordance with the invention the Mylar overlay is caused to move in a direction which is opposite to or against the direction of the recording medium. In this way there is achieved the advantage that the overlay film facilitates the process of cleaning the recording medium of toner and dust, before the medium reaches the recording zone area. The tension between the overlay film take-up roll and the recording tape provides a friction with the tape that effects the removal of the dirt, dust and toner particles before it can reach the recording head. Furthermore, by running the overlay material in opposition to the recording medium, there is thus avoided any possibility of the recording medium tending to unravel the overlay feed reel or spool.

Finally, there is provided by this invention an arrangement which is essential in order to prevent recording head damage in a few seconds and destruction in a few minutes from the movement of the recording tape in intimate operative contact therewith, and yet not adversely affect or impact the recording function.

In accordance with the present invention, therefore, there is provided in a system in which at least the recording zone of a recording head is in intimate operative contact with a recording medium and substantially continuous relative movement is effected between the head and the medium, an arrangement for protecting the recording head from wear and soiling by the recording medium, comprising a thin film of dielectric material arranged between and in intimate contact with at least the recording zone of the recording head and the recording medium and first means for replenishing said film during said relative movement between the recording head and the recording medium.

Also in accordance with the invention, there is provided an arrangement for facilitating the exchange of a substantially endless movable film structure with another such structure, which film structure is operatively disposed between a fixed-position surface and an endless movable medium, comprising first means pivotably mounting said endless medium for continuous movement during operation in a first direction, whereby said medium is retractable from an operative first position in intimate slidable contact with said structure to a retracted second position relatively remote from said structure, and second means pivotably mounting said structure relative to said fixed surface for substantially continuous movement during operation in a second direction and for effecting an operative first position of said structure in intimate slidable contact with said fixed surface and a retractable second position relatively remote from said fixed surface and said medium.

BRIEF DESCRIPTION OF THE DRAWINGS

The above-mentioned and other objects and features will become better understood with refeence to the following detailed description taken in conjunction with the accompanying drawings; in which.

DESCRIPTION OF THE PREFERRED EMBODIMENTS

Figure 1:
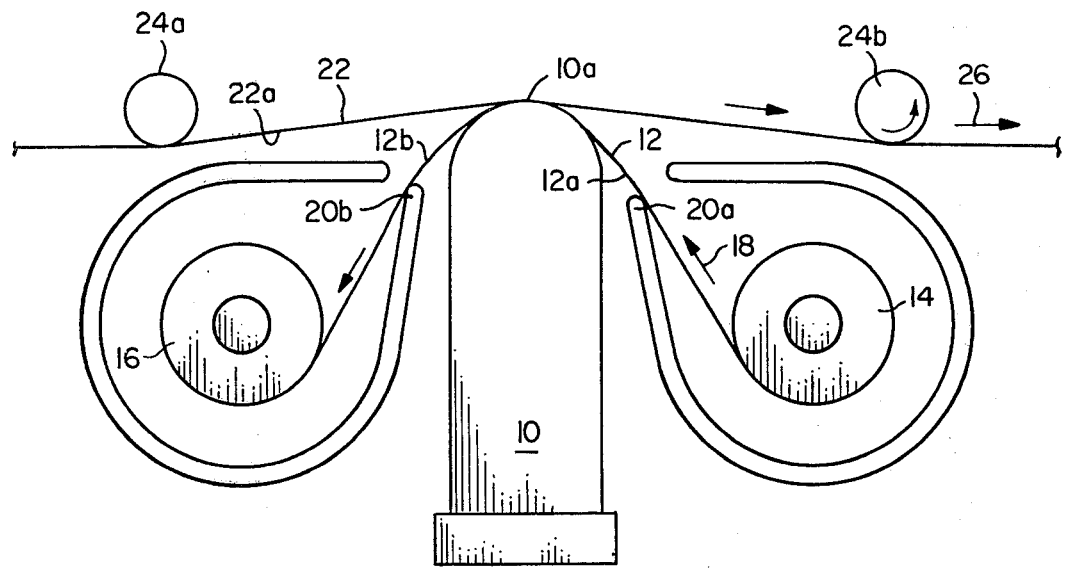
FIG. 1 schematically illustrates in side view the relationship of a protective overlay arrangement according to the invention with a recording head and the associated recording medium.

FIG. 1 schematically illustrates a protective overlay arrangement according to this invention, in which a recording head 10 is protected from wear and soiling. The recording head 10 is shown vertically oriented with its operative surface or face 10a, constituting the recording zone, defining a convex curved surface atop the recording head.

The depicted recording medium is a relatively thin (in width and thickness) magnetic tape 22 which may be constructed in accordance with the teachings of U.S. patent application Ser. No. 268,595 filed May 29, 1981, the subject matter of which, insofar as it is pertinent to the present invention, is incorporated herein by reference. It is here intended that recording tape 22 be endless and move in the direction indicated by the arrow 26 about a rather small loop. The portion of the path of tape 22 above the recording head is at least in part governed by bearing surfaces 24a and 24b, located on either side of the recording head 10. The positions of bearing surfaces 24a and 24b relative to the convex operative face 10a of the recording head 10 are such as to provide a downward tension on tape 22 as it passes over the face 10a due to the recording head protruding somewhat between the bearing surfaces 24a and 24b. In this way, uniform intimate operative contact is assured between the tape 22 and the recording head operative surface 10a.

In between the recording tape medium 22 and the operative face 10a of the recording head 10 there is disposed a substantially endless thin (e.g., ¼ mil thickness) film of plastic material 12 (e.g., polyester terephethalate, such as Mylar) which may be coated on both sides with a lower friction material such as Teflon. This overlay material 12 is fashioned on a feed spool or reel 14 and threaded to a take-up spool or reel 16. In passing from feed reel 14 to take-up reel 16, in the direction indicated by arrow 18 which is opposite to the direction of the tape medium 22, the overlay film 12 is guided by bearing surfaces 20a and 20b located on either side of the recording head 10. Bearing surfaces 20a and 20b perform substantially the same function as bearing surfaces 24a and 24b with regard to the tape 22. Bearing surfaces 20a and 20b are, however, located below the tape 22 and also the bearing surfaces 24a and 24b, and are closer to the recording head 10.

Figure 4:
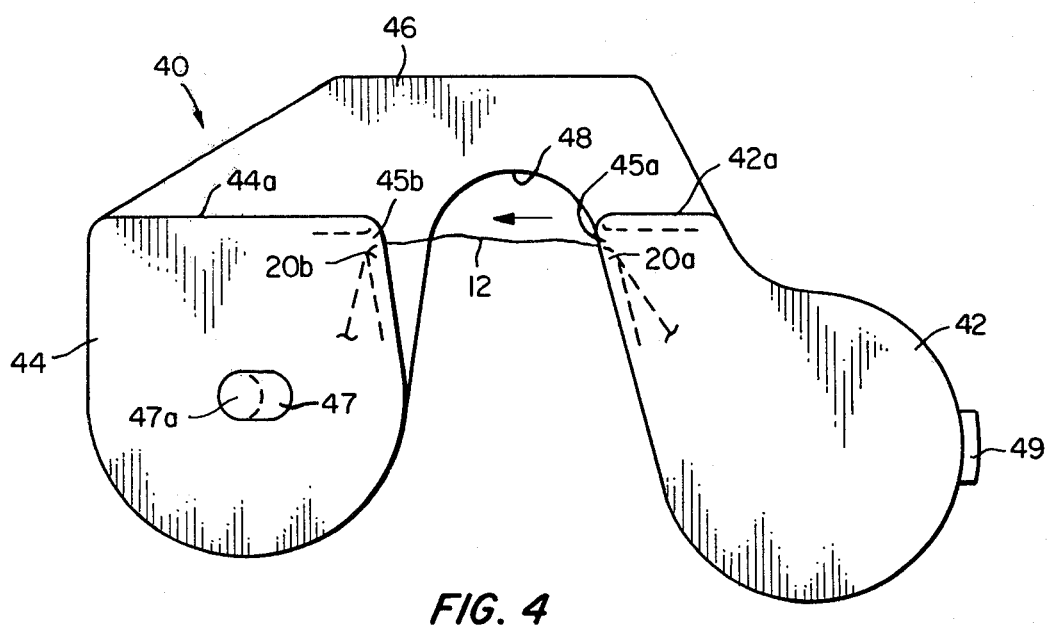
FIG. 4 diagramatically illustrates in side view an embodiment of a cartridge for housing the protective overlay film, schematically illustrated in FIG. 1.

Each of the surfaces and elements associated with path of the protective overlay film 12 may in accordance with this invention be part of a unitary cartridge arrangement design to cooperatively fit about the recording head 10 so as to provide the feed and take-up reels 14 and 16 as well as the bearing surfaces 20a and 20b disposed substantially as shown in FIG. 1 (see also the full cartridge illustrated in FIG. 4).

In operation, when the recording system is operating, the recording medium 22 is moved past the recording head in sliding operative contact and the recording head creates magnetic latent images on the tape. The movement of the tape 22 past the fixed-position recording surface 10a is at relatively high speed (e.g., 40–55 inches/second and higher). As such, the tape 22 is apt to rapidly wear and damage the recording head at the recording zone and to contaminate same in the absence of the protective overlay 12, especially since it is contemplated that the outer (lower) surface 22a of the tape bearing the latent magnetic images is to be toned with abrasive particulate toner particles. By the presence of the smooth, low-friction surface ¼ mil thick plastic film 12, moving at relatively slow speed (e.g., five to fifteen inches/hour) relative to the recording head in the direction 18 which is opposite to that (26) of the tape 22, the recording head is prevented from contacting the recording medium on the one hand and the operative surface 22a of the recording medium 22 is, on the other hand, cleaned of dust and toner particles by the sliding contact between it and the overlay 12 prior to the recording medium arriving at the recording zone. In this way the recording head is continuously presented with a clean protective overlay surface 12a while the other major surface 12b of the overlay performs the cleaning function of the toner-particle-receiving tape surface 22a while protecting the recording head from wear and soiling. The relatively very slow sliding movement of the overlay 12 over the recording head operative surface 10a together with the smooth, non-abrasive surface of the overlay, ensure that wear of the recording head as a result of the sliding-movement contact between it and the overlay 12 is minimized.

The objective of minimizing recording head wear can be facilitated by having the overlay substrate material coated on either or both sides with say a very thin film of Teflon material. It has been found that in such instances, some of the Teflon lubricant material is accumulated on the tape medium 22. The result is that a continuing lubrication effect to the tape is created thus increasing the lifetime of the tape 22 itself even in the face of the tape continually undergoing abrasive cleaning and scraping functions to remove residual toner particle to ready the tape for its next imaging and to keep the tape back clean.

Figure 2:
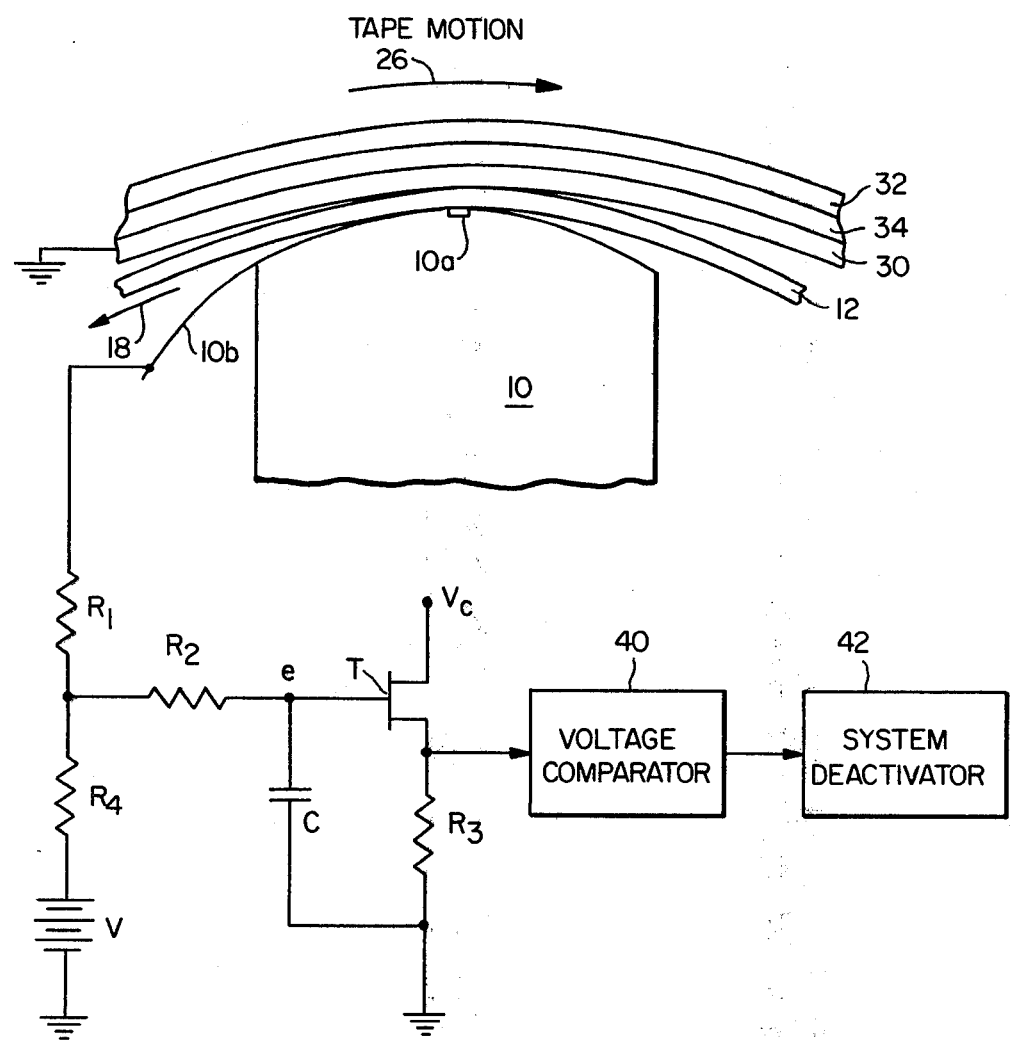
FIG. 2 schematically illustrates an electronic alarm arrangement for protecting the recording head via the protective overlay, in accordance with the invention.

FIG. 2 schematically illustrates one embodiment of electrical circuit arrangement in conjunction with the conductive recording tape and recording head for providing alarm security to the recording system and thereby prevent damage to the recording head. In FIG. 2, the recording medium or tape 22 is illustrated as a laminate which comprises a magnetizable layer 30 a plastic substrate ( e.g., a Mylar) 32 and a conductive underlayer 34 lying between layers 30 and 32. It is intended that magnetizable layer 30 have some conductivity (i.e., at least a semiconductor level of $10^7$ ohms/square) and that it in combination with the conductive unerlayer 34 (itself having a conductivity in the order of $10^4$ ohms/square) would be able to readily provide a conductive path as needed. Conductive sublayer 34 is shown as being connected to common or ground.

Recording head 10, as shown, is provided with a conductive element 10b which leads to the delicate recording zone area 10a. Conductive element 10b may take the form of one of the actual recording elements or may be a separately provided conductive path. Conductive element 10b is connected to the electrical circuit shown which includes in block illustration a voltage comparator 40 and a system deactivator 42. The electrical circuit, like the magnetic tape 22, is connected to common or ground.

Conductive element 10b is connected by a pair of resistors $R_1$ and $R_4$ arranged in series, to the positive side of a DC power supply V which supply in turn is grounded. The juction of resistors $R_1$ and $R_4$ is connected via a resistor $R_2$ to the gate of a FET transistor T. The drain lead of the FET transistor T is connected directly to a voltage Vc and the source lead of the FEt is connected through a resistor $R_3$ to ground. A capacitor C is coupled between ground and the junction point of resistor $R_2$ and the gate of the FET.

In the above-described circuit, it is intended that the resistor values be consistent with the following relationship:

$$10^4 \leq R_1 << R_4 << R_2,$$

and that the time constant $R_2C$ of the circuit be approximately equal to $10^{-2}$ sec.

The output of the above-described circuitry is taken from the source lead of the FET and fed to a voltage comparator arrangement 40. The output of comparator 40 is in turn connected to a system deactivator arrangement which at least effects a stoppage of the tape 22 movement.

In operation as long as protective overlay 12 is maintained between the conductive element 10b and the recording medium 22, the voltage received by the comparator from the circuitry is at a level which gives rise to no alarm signal to deactivator 42. In the event that overlay 12 should run out or stop its movement for whatever reason such that a hole becomes worn through it, thus effecting electrical contact between conductive element 10b and tape 22, the now closed current path changes the circuit condition such that a different voltage level is output to the comparator stage, which in turn triggers the system deactivator to shut down at least the tape 22 movement part of the machine.

Referring to FIG. 4, there is illustrated in a side view a full cartridge design 40 for housing the protective overlay film 12. Cartride 40 preferably is made of plastic and is comprised of left and right lobes 44, 42 respectively, which are structured to have the overlay film 12 move leftwardly in the FIG. 4 frontal view from lobe 42 to lobe 44. In particular, the overlay film 12 moves from lobe 42 through the latter's associated opening 45a, as supported by bearing surface 20a, across an opening wide enough to receive recording head 10, there to be received in opening 45b of lobe 44, as supported by bearing surface 20b, and wound onto the take-up reel housed in lobe 44. Both lobes 42 and 44 are provided with a flat-top surface 42a, 44a respectively, which collectively constitute a top surface of the cartridge situated to avoid an interference with the magnetic tape medium 22 in its passage to and away from the recording head area. Lobes 42 and 44 are securely maintained in fixed relationship to one another via a bridge portion 46 mating with top portions of lobes 42 and 44 rearwardly of the respective surfaces 42a and 44a. Supply reel lobe 44 is provided with a somewhat elongated ellipticaly shaped tab 47 secured to or part of a shaft 47a protruding perpendicularly from the front side surface of lobe 44. Lobe 42 is also provided with a tab 49 protruding from the right side thereof in FIG. 4, i.e., opposite the lobe 42 surface closest to the recording head.

When the cartridge is placed in position (FIG. 5), the recording head top surface 10a urges the film 12 up into contact with the tape 22 as the recording head fits into arch 48 (FIG. 1). In this way, the recording head 10, magnetic tape medium 22 and the protective overlay 12 are readily brought into secure intimate contact with one another.

Figure 5:
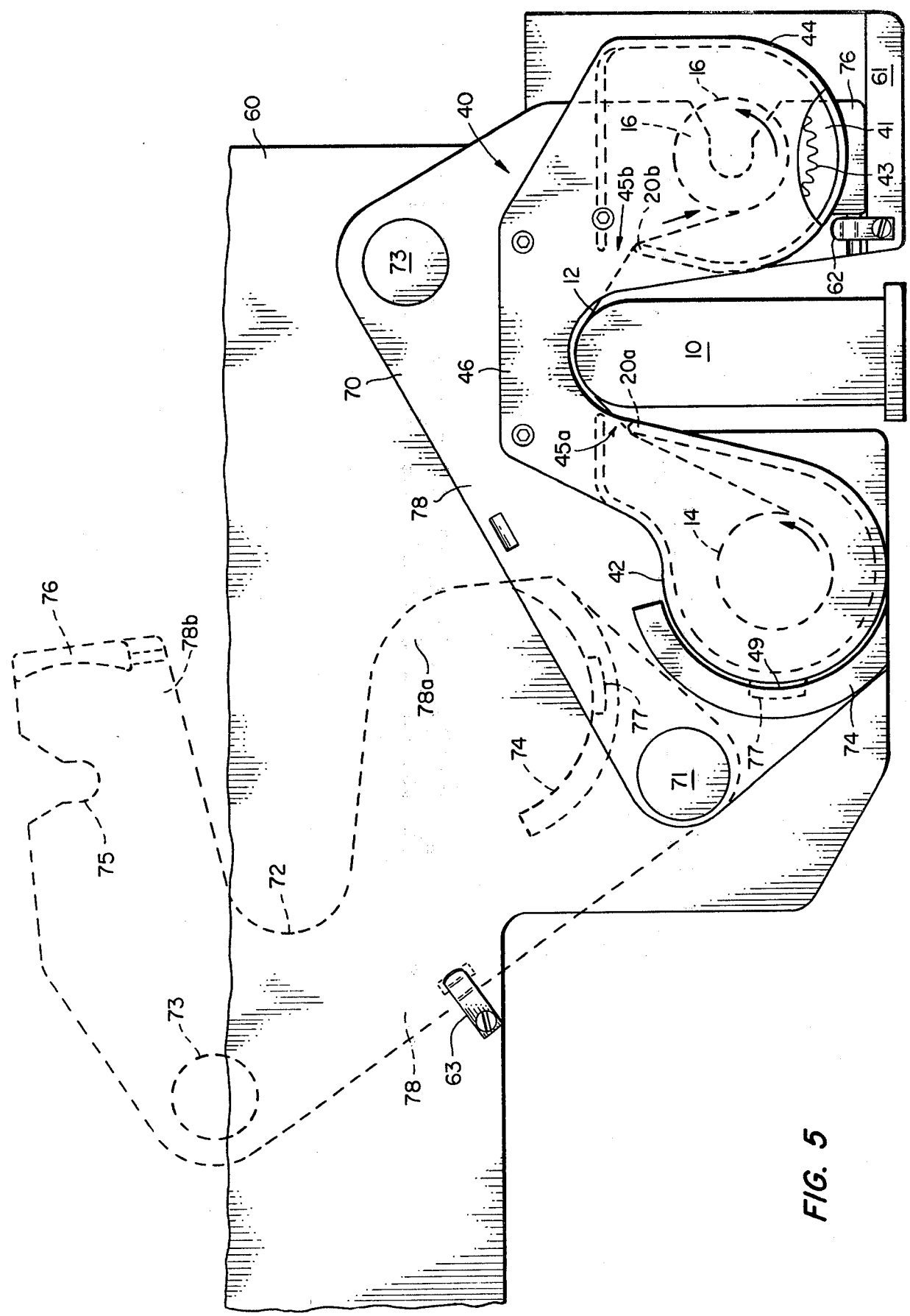
FIG. 5 diagramatically illustrates in side view a pivotably mounted holder arrangement, in actual and phantom orientations, for the cartridge of FIG. 4, in relationship with the recording head.

Reference is now made to FIG. 5 in which there is illustrated in a side view the cartridge 40 secured into its operative position and a pivotable cartridge holder arrangement, the latter shown with the cartridge in the loaded position and without the cartridge in a ghost loading position. As shown, pivotable cartridge holder 70 is pivotably mounted on a back plate 60 via pivot 71. Pivotable holder 70 is comprised of a main body portion 78 which is substantially divided into left and right portions 78a and 78b, separated by an archuate region 72 designed to cooperatively fit about the recording head 10 when the holder is pivoted into the loaded or operating position as shown. The left side portion 78a of pivotable holder 70 includes a perpendicularly extending curved surface 74 for receiving the supply reel lobe 42 of cartridge 40. In this regard, curved surface 74 is provided with a perpendicularly running small recess 77 for receiving tab 49 of lobe 42. At the bridging portion of pivotable holder member 78 there is provided a finger hole 73 for facilitating withdrawal of the holder from the loaded position, the latter being secured in place by a clip 62 mounted on the base 60, to the loading position where holder 78 is similarly secured in position by a clip 63, and vice versa. Arm 78b of the holder is provided with a tapered side recess 75 for receiving tab 47 of the cartridge (FIG. 4) when the latter is loaded into the holder. Arm 78b is further provided with a perpendicularly extending curved portion 76 which is provided for ensuring the stable positioning of the cartridge in the holder, in particular lobe 44 thereof, when the holder is caused to assume the loaded position.

As is particularly illustrated in FIG. 5, the cartridge 40 is provided on the lower back side of lobe 44 with a cut-away area 41, which exposes a gear 43 operatively coupled to the take-up spool 16. In the loaded position, the gear 43 mates with a suitably disposed gear mounted on the shaft of a cartridge driving motor (not shown). A more complete understanding of the structure of the cartridge 40 may be gathered from co-pending U.S. Patent application Ser. No. 290,273.

In operation, the holder 78 is placed in the loading position as illustrated by the dashed ghost illustration in FIG. 5, corresponding to the holder being held by clip 63. In this position, the cartridge 40 is loaded onto the holder with the front side thereof, as viewed in FIG. 4, facing the holder structure. The cartridge is loaded in a vertically downward motion whereby tab 47 engages with beveled or tapered recess 75 and tab 49 engages with channeled recess 77, with the lobe 42 of the cartridge seating in curved member 74 and lobe 44 snugly resting against curved member 76. Finger hole 73 is then utilized to move the holder 78 into the loaded position as illustrated in FIG. 5, whereby as the holder is pressed into locking position in which the bottom right side portion of the holder engages clip 62, the top-most portion of the recording head 10 engages with the protective overlay 12 whereby the latter is pressed into intimate contact with the recording zone of the recording head. In this position, gear 43 has engaged with the driver motor gear such that in operation, take-up reel 16 is caused to rotate in a counter-clockwise direction, thus drawing overlay 12 from the feed reel 14 through opening 45a of the left side lobe 42 across the top of the recording head and through the opening 45b of the right side lobe 44.

Figure 3:
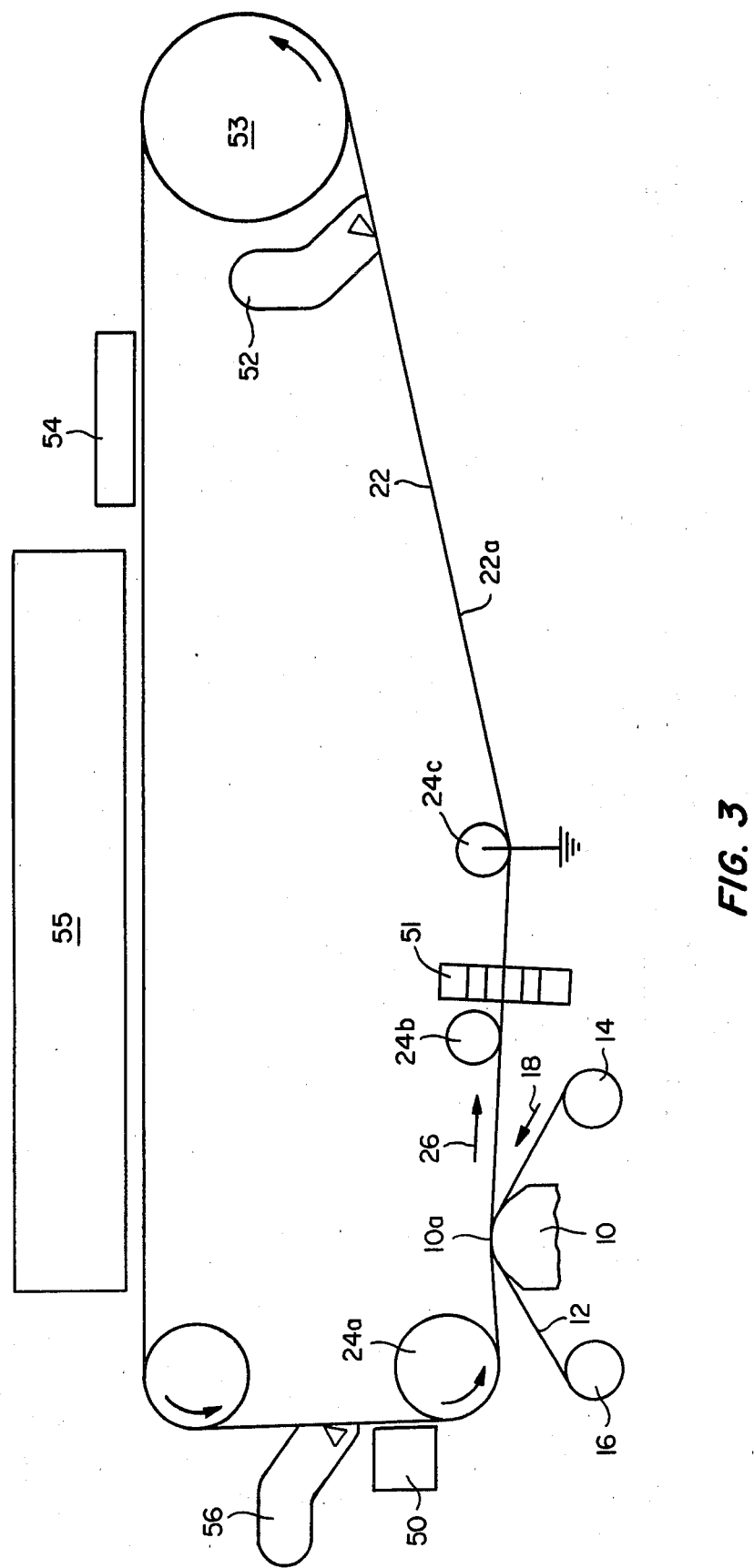
FIG. 3 schematically illustrates the operative loop of a magnetic medium in a magnetographic apparatus, as to which various components associated with the medium may be collectively pivotably mounted.

In the loaded position, as shown in FIG. 5, the apparatus is then ready for the pivotable plate (not shown) which has mounted thereon the various components illustrated in FIG. 3, to itself be pivoted into position, whereby the recording medium is caused to be pressed into intimate contact with the protective overlay in the vicinity of the recording zone of the recording head 10 (as schematically indicated in FIG. 1).

What is claimed is:

1. In a system in which at least the recording zone of a recording head is in intimate operative contact with a recording medium and substantially continuous relative movement is effected between the head and the medium, and a dielectric material is provided between the head and the medium, the protective arrangement comprising, first means for detecting a first condition of electrical conductivity between the head and the medium and second means responsive to said first means for effecting cessation of relative movement between such head and said medium when said first condition is detected.

2. An arrangement according to claim 1 wherein said first means comprises said recording head being provided in the vicinity of the recording zone with at least one conductor, said recording medium being electrically coupled to a common, and circuit means electrically coupled between said common and said conductor.

3. An arrangement according to claim 2 wherein said circuit means comprises an electric switch, means for providing a first potential for maintaining said switch in a closed state when a relatively high impedance is present between said medium and said conductor, and means providing a second potential when a relatively low impedance is present between said medium and said conductor for effecting in said switch a second operative state.

4. An arrangement according to claim 1 wherein said medium, said material and at least the recording zone of the recording head form a layered structure which is coupled to said first means such that said first condition is effected whenever said medium is permitted to make electrical contact with said recording head.

5. An arrangement for facilitating the exchange of a substantially endless movable film structure with another such structure, which film structure is operatively disposed between a fixed-position surface and an endless movable medium, comprising first means pivotably mounting said endless medium for continuous movement during operation in a first direction, whereby said medium is retractable from an operative first position in intimate slidable contact with said structure to a retracted second position relatively remote from said structure, and second means pivotably mounting said structure relative to said fixed surface for substantially continuous movement during operation in a second direction and for effecting an operative first position of said structure in intimate slidable contact with said fixed surface and a retractable second position relatively remote from said fixed surface and said medium.

6. An arrangement according to claim 5 wherein said second means comprises a holding member predeterminably pivotable relative to said fixed surface and cartridge means housing said substantially endless film structure and shaped to be accepted into said holder member, the cooperative combination of said cartridge and said holding member enabling a portion of said structure to be in intimate slidable contact with said fixed surface when said first means assumes said first position.

7. An arrangement according to claim 6 wherein when said first and second means assume their respective first positions, said structure is between said medium and said fixed surface.

8. An arrangement according to claim 7 wherein the respective directions of pivotable movement of said first and second means to the respective second positions are substantially perpendicular to one another.

9. An arrangement according to claim 6 wherein said holder member and said cartridge means are cooperatively structured such that said cartridge means can be accepted into said holder member in only one orientation of the cartridge means.

10. An arrangement according to claim 5 wherein said fixed surface is the operative face of a recording head, said medium is a recording medium and said structure is a protective overlay to the operative face of the recording head.

11. An arrangement according to claim 5 wherein said first and second means are structured to effect relative sliding movement between said structure and said medium.

12. An arrangement according to claim 11 wherein the movement of said structure is in a direction opposite to that of said medium.

13. An arrangement according to claim 5 wherein said structure, said medium and said surface are disposed for relative moving contact such that said structure protects said surface from wear by said medium and cleans said medium as it approaches said surface.

14. An arrangement according to claim 13 wherein said first and second means respectively include means for effecting movement of the medium and the structure relative to each other and to said fixed surface.

15. An arrangement according to claim 14 wherein said means for effecting movement of the medium includes means for permitting said medium to move in an endless path at relatively high speed with regard to said fixed position surface and said means for effecting movement of the structure includes means for permitting said structure to move passed said fixed surface at relatively low speed with respect thereto, and relative to said medium.

* * * * *